Oct. 16, 1951  J. F. GALL  2,571,560
PACKING STRUCTURE
Filed June 28, 1947
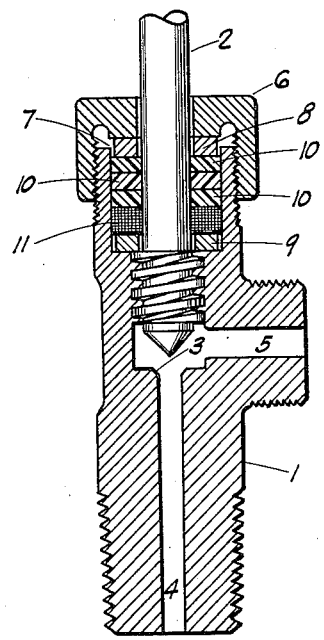
John F. Gall
INVENTOR.
BY *[signature]*
ATTORNEY.

Patented Oct. 16, 1951

2,571,560

UNITED STATES PATENT OFFICE 2,571,560

PACKING STRUCTURE

John F. Gall, Narberth, Pa., assignor to The Pennsylvania Salt Manufacturing Company, Philadelphia, Pa., a corporation of Pennsylvania Application June 28, 1947, Serial No. 757,914

7 Claims. (Cl. 288—2)

This invention relates to a new packing structure for retaining fluorine under pressure.

It has been common heretofore in supplying packing material for valves, bearings and the like to retain gases or other fluids under pressure, to employ two or more materials of construction of different characteristics in order to obtain efficient packing. For example, it is common to build up a packing structure by enclosing a soft material having excellent sealing qualities between enclosing elements made of a harder material having poor sealing qualities but having sufficient resistance to deformation that it is effective to confine the sealing material within the desired region. There has been no need, when providing packing material for retaining fluids heretofore handled under pressure, to employ a series of materials of varying sealing qualities and of varying resistance to attack by the fluid being retained.

I have now discovered that in retaining elemental fluorine and chemically similar materials (e. g. chlorine trifluoride) under pressure it is important to provide, in a packing structure, in addition to the primary sealing material of satisfactory sealing qualities, a second packing material having excellent resistance to the fluorine-containing fluid in static or near static condition and at the same time having sufficient sealing qualities to maintain the fluid in near static condition, i. e. to prevent rapid flow of the material through the packing structure in event of failure of the primary sealing material. This has been found to solve a problem unique with fluorine and chemically similar materials, namely the hazard of igniting valves, containers and other structures because of temporary escape of fluorine, as more fully explained below.

The packing structure of my invention contains two essential elements; the first, a relatively soft material, such as an organic plastic, of excellent sealing characteristics and fair resistance to attack by fluorine or the like, and the second, a material of excellent resistance to attack by the fluorine-containing fluid and having adequate packing characteristics to permit no more than slow seepage of the fluid from a region where it is maintained under a pressure up to 2200 pounds per square inch. The packing structure is so arranged that the second material is interposed between the first material and the zone leading to the fluid under pressure. The preferred primary sealing material of my packing structure is the plastic solid obtained by the polymerization of tetrafluoroethylene. This material is described in the June 1946 issue of Modern Plastics (volume 23, No. 10) pages 134 and 135. The primary sealing material of my packing structure may consist of this plastic alone or of a mixture in which this plastic is the matrix and other materials are imbedded, e. g. such materials as the usual fillers, comminuted metal, or other substances that may be added to this solid polymer to give it special characteristics.

The preferred secondary sealing material in the packing structure of my invention is a loose or spongy form of a relatively soft metal which is resistant to fluorine attack. Such metals include copper, nickel, Monel alloys and magnesium. The loose or spongy form of the metal may be obtained by fabricating braided wire or crumpled foil from the metal or by fabricating the metal in other forms such that the mass has an apparent bulk density ranging from 50 to 80%, preferably 65 to 70%, of the true density of the continuous solid metal.

A preferred embodiment of the packing structure of my invention is illustrated on the accompanying drawing, which forms a part of this application.

On the drawing, reference numeral 1 indicates the body of a valve structure applied to a steel cylinder containing fluorine under 400 pounds per square inch gauge pressure. Reference numeral 2 indicates the valve stem which upon being turned seats upon the surface 3 to prevent fluorine flow, or is removed from this surface whereupon fluorine is permitted to flow from the passage 4 to the passage 5.

The body of the valve 1 in conjunction with the packing nut 6 forms an annular chamber 7 surrounding the valve stem 2. The packing material intended to prohibit leakage of fluorine is contained within the annular chamber 7. The top and bottom of this annular chamber are bounded by the brass rings 8 and 9 respectively and the essential elements of my packing structure are contained between these two brass rings.

In the embodiment of my packing structure shown in the drawing there are three rings of solid polymer of tetrafluoroethylene next underneath the brass ring 8. These three rings are all indicated by the reference numeral 10 on the drawing. This material, when the packing nut 6 is tightened, forms an excellent seal around the valve stem 2 and prevents leakage of fluorine so long as the material holds up against the attack by the fluorine.

Underneath the plastic rings 10 in the embodiment shown in the drawing is a ring of copper braid 11; the individual strands in this braid are about 32 gauge copper wire and the braid structure has an apparent bulk density of about 65% of the true density of solid bar copper.

The solid tetrafluoroethylene polymer employed for the washers 10 is generally reasonably resistant to fluorine and there may be installations where there is no failure of this material and the copper braid is not called upon to perform its important function in the packing. However, the organic plastic may succumb to fluorine attack and fail, thus providing passage for escape of fluorine through the packing structure.

In such an event, if the washer formed of copper braid were not there, the heat of reaction between the flowing stream of fluorine gas and the organic plastic would greatly increase the speed of attack of the plastic by the fluorine and the condition of the plastic seal would rapidly worsen. Soon the remaining plastic material would burst into flame, its combustion being supported by the fluorine, and in many cases the heat of reaction from this combustion would be great enough to ignite the metal of the valve and perhaps even the metal of the cylinder (since metals like brass and steel have a considerably lower ignition temperature in a fluorine atmosphere than an oxygen atmosphere). In addition, the stream of out-rushing fluorine, an extremely corrosive gas, would constitute a serious threat to the safety of any person close to the cylinder, and may cause severe damage to property.

However, with the washer of copper braid 11 present, if the plastic sealing material should fail, the copper braid forms sufficient of a seal to hold the escape of fluorine down to a low seepage, sufficiently low that the further deterioration of the plastic sealing material is slow and it does not burst into flame and eventually ignite the metal of the valve. Nor does the copper braid material, of course, reach its ignition temperature since the rate of reaction between plastic and fluorine, and hence the local temperature, is held at a low value through the sealing effect of the copper braid. Under these conditions the material of the copper braid and the valve material are substantially impervious to attack by the fluorine. Furthermore, the resulting slow leak of fluorine could easily be coped with, and stopped, for example, by merely turning off the valve, whereby a positive metal to metal seal is secured, and no pressure of fluorine gas upon the packing will persist.

It is clear, of course, that the packing structure of my invention may take other embodiments. For example, crumpled foil or braid of other metals such as nickel, Monel alloys or magnesium may take the place of the copper; also there is no particular significance in the number of washers of either packing material employed.

Since many modifications are possible in the article of manufacture of my invention as above described without departing from the scope of the invention, it is intended that the above description of my invention should be interpreted as illustrative, and the invention is not to be limited except as set forth in the claims which follow.

I claim:

1. A packing structure to seal a space against escape of a highly reactive fluorine-containing fluid under pressure, comprising a primary sealing material having at least a matrix consisting of an organic plastic relatively resistant to attack by fluorine, and a secondary sealing material interposed between the primary material and the zone communicating with the fluid under pressure, consisting of a loose structure formed from a metal selected from the group consisting of copper, nickel, Monel alloys and magnesium and containing a plurality of tortuous passages which will permit only a relatively slow passage of said highly reactive fluorine-containing fluid on failure of said primary sealing material, both the primary and the secondary sealing materials being positioned to form a barrier against flow of fluid through the space.

2. A packing structure to seal a space against escape of a highly reactive fluorine-containing fluid under pressure, comprising a primary sealing material having at least a matrix consisting of a plastic solid polymeric tetrafluoroethylene, and a secondary sealing material interposed between the primary material and the zone communicating with the fluid under pressure, consisting of a loose structure formed from a metal selected from the group consisting of copper, nickel, Monel alloys and magnesium, said loose structure having an apparent bulk density in the range of about 50 to 80% as compared to the true density of the metal employed and containing a plurality of tortuous passages which will permit only a relatively slow passage of said highly reactive fluorine-containing fluid on failure of said primary sealing material, both the primary and the secondary materials being positioned to form a barrier against flow of fluid through the space.

3. A packing structure to seal a space against escape of a highly reactive fluorine-containing fluid under pressure, comprising a primary sealing material having at least a matrix consisting of a plastic solid polymeric tetrafluoroethylene, and a secondary sealing material interposed between the primary material and the zone communicating with the fluid under pressure, consisting of a loose structure formed from a metal selected from the group consisting of copper, nickel, Monel alloys and magnesium, said loose structure having an apparent bulk desity in the range of about 65 to 70% as compared to the true density of the metal employed and containing a plurality of tortuous passages which will permit only a relatively slow passage of said highly reactive fluorine-containing fluid on failure of said primary sealing material, both the primary and the secondary materials being positioned to form a barrier against flow of fluid through the space.

4. A packing structure to seal a space against escape of fluorine under pressure, comprising a primary sealing material having at least a matrix consisting of a plastic solid polymeric tetrafluoroethylene, and a secondary sealing material interposed between the primary material and the zone communicating with the fluorine, consisting of metal braid or crumpled foil formed from a metal selected from the group consisting of copper, nickel, Monel alloys and magnesium, said metal structure having an apparent bulk density in the range of about 50 to 80% as compared to the true density of the metal employed and containing a plurality of tortuous passages which will permit only a relatively slow passage of fluorine on failure of said primary sealing material, both the primary and the secondary sealing materials being positioned to form a barrier flow of fluorine gas through the space.

5. A packing structure to seal a space against escape of fluorine under pressure, comprising a primary sealing material having at least a matrix consisting of a plastic solid polymeric tetrafluoroethylene, and a secondary sealing material interposed between the primary material and the zone communicating with the fluorine, consisting of metal braid or crumpled foil formed from a metal selected from the group consisting of copper, nickel, Monel alloys and magnesium, said metal structure having an apparent bulk density in the range of about 65 to 70% as compared to the true density of the metal employed and containing a plurality of tortuous passages which will permit only a relatively slow passage of fluorine on failure of said primary sealing material, both the primary and the secondary sealing material being positioned to form a barrier flow of fluorine gas through the space.

6. A valve packing structure for use in a valve on a container for fluorine under pressure, comprising a primary sealing material having at least a matrix consisting of a plastic solid polymeric tetrafluoroethylene, and a secondary sealing material interposed between the primary material and the zone communicating with the fluorine, consisting of copper braid having an apparent bulk density in the range of about 50 to 80% as compared to the true density of bar copper and containing a plurality of tortuous passages which will permit only a relatively slow passage of fluorine on failure of said primary sealing material.

7. A unitary packing adapted for use with highly corrosive materials, said packing having an impervious sealing portion formed of a material partially resistant to said corrosive materials and a pervious sealing portion formed of a material having considerably greater corrosion resistant properties with respect to said corrosive materials than the material of said first mentioned portion, said pervious portion being provided with a plurality of tortuous passages which permit only a relatively slow passage of said corrosive material through said pervious portion on failure of said impervious portion, said portions being so positioned with respect to each other that said pervious portion formed of relatively higher corrosion resistant material is between said corrosive material and said impervious portion.

JOHN F. GALL.

REFERENCES CITED

The following references are of record in the file of this patent:

UNITED STATES PATENTS

| Number | Name | Date |
| --- | --- | --- |
| 18,235 | Clark | Sept. 22, 1857 |
| 1,844,903 | Queen | Feb. 9, 1932 |
| 1,946,527 | Field | Feb. 13, 1934 |
| 2,274,699 | Jacobs | Mar. 3, 1942 |
| 2,353,226 | Driscoll et al. | July 11, 1944 |
| 2,393,967 | Brubaker | Feb. 5, 1946 |

OTHER REFERENCES

Durametallic Packins, published by Durametallic Corporation, Kalamazoo, Michigan, in 1934, page 12. (Copy in Div. 52.)